United States Patent
McCormick et al.

(10) Patent No.: US 7,385,965 B2
(45) Date of Patent: Jun. 10, 2008

(54) MULTIPROCESSOR CONTROL BLOCK FOR USE IN A COMMUNICATION SWITCH AND METHOD THEREFORE

(75) Inventors: James S. McCormick, Stittsville (CA); Jonathan Bosloy, Kanata (CA); John C. Burns, Los Altos, CA (US)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 1070 days.

(21) Appl. No.: 09/746,602

(22) Filed: Dec. 21, 2000

(65) Prior Publication Data

US 2002/0083260 A1 Jun. 27, 2002

Related U.S. Application Data

(60) Provisional application No. 60/224,440, filed on Aug. 10, 2000.

(51) Int. Cl.
*H04L 12/28* (2006.01)
*H04L 12/56* (2006.01)
*G06F 13/00* (2006.01)

(52) U.S. Cl. .............. 370/355; 370/395.41; 370/395.42; 370/469; 710/111

(58) Field of Classification Search ................. 370/398, 370/385, 360, 395.1, 389, 395.4, 395.41, 370/395.42, 412, 413, 415, 416, 428, 469, 370/355; 710/111
See application file for complete search history.

(56) References Cited

U.S. PATENT DOCUMENTS

| | | | |
|---|---|---|---|
| 4,421,955 A | * | 12/1983 | Mori et al. |
| 4,775,974 A | * | 10/1988 | Kobayashi ................ 370/231 |
| 4,964,119 A | | 10/1990 | Endo et al. |
| 5,253,248 A | | 10/1993 | Dravida et al. |
| 5,295,137 A | * | 3/1994 | Jurkevich .................. 370/389 |
| 5,600,640 A | | 2/1997 | Blair et al. |
| 5,657,449 A | * | 8/1997 | Osaki ........................ 370/357 |
| 5,802,040 A | * | 9/1998 | Park et al. .................. 370/232 |
| 5,838,677 A | * | 11/1998 | Kozaki et al. .............. 370/389 |
| 5,854,899 A | | 12/1998 | Callon et al. |
| 5,912,877 A | | 6/1999 | Shirai et al. |
| 5,917,805 A | | 6/1999 | Manning et al. |

(Continued)

FOREIGN PATENT DOCUMENTS

EP 0 645 702 A1 3/1995

*Primary Examiner*—Alpus H. Hsu

(57) ABSTRACT

A communication switch that includes a multiprocessor control block and a method therefore is presented. The multiprocessor control block includes a centralized resource and routing processor that controls resource allocation and routing functionality within the switch. A plurality of intermediate processors operably coupled to the resource and routing processor perform call processing for corresponding portions of the connections supported by the switch, where such call processing includes issuing resource allocation requests to the resource and routing processor. Each of the intermediate processors further performs functions associated with a signaling layer portion of the protocol stack. The multiprocessor control block also includes a link layer processor operably coupled to the plurality of intermediate processors, where the link layer processor also couples to a switching fabric of the communication switch. The link layer processor receives ingress data units from the switching fabric and selectively forwards these ingress data units to one or more of the plurality of intermediate processors for processing. The link layer processor also received egress data units from the plurality of intermediate processors that it forwards to the switching fabric.

30 Claims, 7 Drawing Sheets

U.S. PATENT DOCUMENTS

| | | |
|---|---|---|
| 5,926,456 A | 7/1999 | Takano et al. |
| 5,967,054 A | 10/1999 | Rosenfeld |
| 5,978,359 A | 11/1999 | Caldara et al. |
| 5,987,027 A * | 11/1999 | Park et al. ................... 370/360 |
| 6,163,861 A * | 12/2000 | Yoshioka et al. ............ 714/712 |
| 6,201,810 B1 | 3/2001 | Masuda et al. |
| 6,377,550 B1 * | 4/2002 | Prasad ..................... 370/236.1 |
| 6,389,012 B1 * | 5/2002 | Yamada et al. .............. 370/357 |
| 6,421,342 B1 * | 7/2002 | Schwartz et al. ............ 370/392 |
| 6,438,135 B1 * | 8/2002 | Tzeng ........................ 370/412 |
| 6,459,699 B1 * | 10/2002 | Kimura et al. .............. 370/396 |
| 6,529,478 B1 | 3/2003 | Schwartz et al. |
| 6,657,962 B1 | 12/2003 | Barri et al. |

* cited by examiner

Protocol Stack 290

MULTIPROCESSOR CONTROL BLOCK FOR USE IN A COMMUNICATION SWITCH AND METHOD THEREFORE

RELATED APPLICATIONS

This application claims priority to a provisional application 60/224,440 filed Aug. 10, 2000, having the same title as the present application. The present application is related to a co-pending application Ser. No. 09/746,601 entitled "BUFFERING SYSTEM FOR USE IN A COMMUNICATION SWITCH THAT INCLUDES A MULTIPROCESSOR CONTROL BLOCK AND METHOD THEREFORE", which was filed on the same date as the present application.

BACKGROUND OF THE INVENTION

Switches commonly used in communication networks often include a plurality of line cards that are intercoupled by a switching fabric. Each of the plurality of line cards receives ingress data and transmits egress data. The switching fabric allows ingress data received by one card to be directed to an egress connection on one or more of the other line cards included within the communication switch.

Various processing operations are typically performed for the various connections supported by the communication switch. Such connections can include both switched and permanent connections. The processing operations include routing that must occur within the switch such that ingress data received by one line card is directed to the appropriate egress line card. In prior art systems, the processing operations including routing were typically performed by individual processors included in each of the line cards of the communication switch. FIG. 1 illustrates a prior art switch that includes a switching fabric and a plurality of line cards. As is illustrated, each of the line cards includes a processor that is responsible for performing the various call processing and routing functions for connections that are directed through that particular line card.

Such distributed call processing provides some disadvantages that become more apparent as data communication speeds continue to increase. In some cases, specific line cards within the switch will be much more active than other line cards. Some of the more active line cards can become overwhelmed by the amount of call traffic they are required to service. Because of the distributed nature of the call processing amongst the various line cards, a processor on a line card that is not being fully utilized is unable to assist the overburdened processor on another line card. As such, the overall call processing bandwidth available within the switch is not fully utilized.

Another disadvantage of distributed call processing is that none of the processors in the individual line cards has a global perspective on the operation of the switch. As such, the adaptations that an individual processor is capable of performing in order to increase the efficiency of the operation of the switch are limited.

Therefore, a need exists for a communication switch that includes call processing and routing functionality that does not suffer from the disadvantages presented by distributed processing of prior art systems.

DETAILED DESCRIPTION

Generally, the present invention provides a communication switch that includes a multiprocessor control block and a method therefore. The multiprocessor control block includes a centralized resource and routing processor that controls resource allocation and routing functionality within the switch. A plurality of intermediate processors operably coupled to the resource and routing processor perform call processing for corresponding portions of the connections supported by the switch, where such call processing includes issuing resource allocation requests to the resource and routing processor. Each of the intermediate processors further performs functions associated with a signaling layer portion of the protocol stack. The multiprocessor control block also includes a link layer processor operably coupled to the plurality of intermediate processors, where the link layer processor also couples to a switching fabric of the communication switch. The link layer processor receives ingress data units from the switching fabric and selectively forwards these ingress data units to one or more of the plurality of intermediate processors for processing. The link layer processor also received egress data units from the plurality of intermediate processors that it forwards to the switching fabric.

By centralizing the resource allocation and routing operations within a common resource and routing processor that controls such operations for the entire switch, greater bandwidth allocation flexibility exists within the switch such that the switch operates in a more efficient manner. By separating the functions formerly performed by distributed processors within each of the line cards into different sets of functions that are distributed amongst various processors included in the multiprocessor control block described herein, advantages of a centralized processor are realized along with the speed advantages that parallel processing provides. The division of processing functionality amongst the multiple processors included in the multiprocessor control block is based on the ease with which the processing operations can be distributed amongst multiple processors. For example, processing functions corresponding to the signaling layer can be distributed amongst the plurality of intermediate processors, whereas routing functionality is best performed by a single resource and routing processor that has a global perspective. Similarly, a single link layer processor is often adequate to perform the link management functionality and physical layer interactions for the entire switch.

Figure 1:
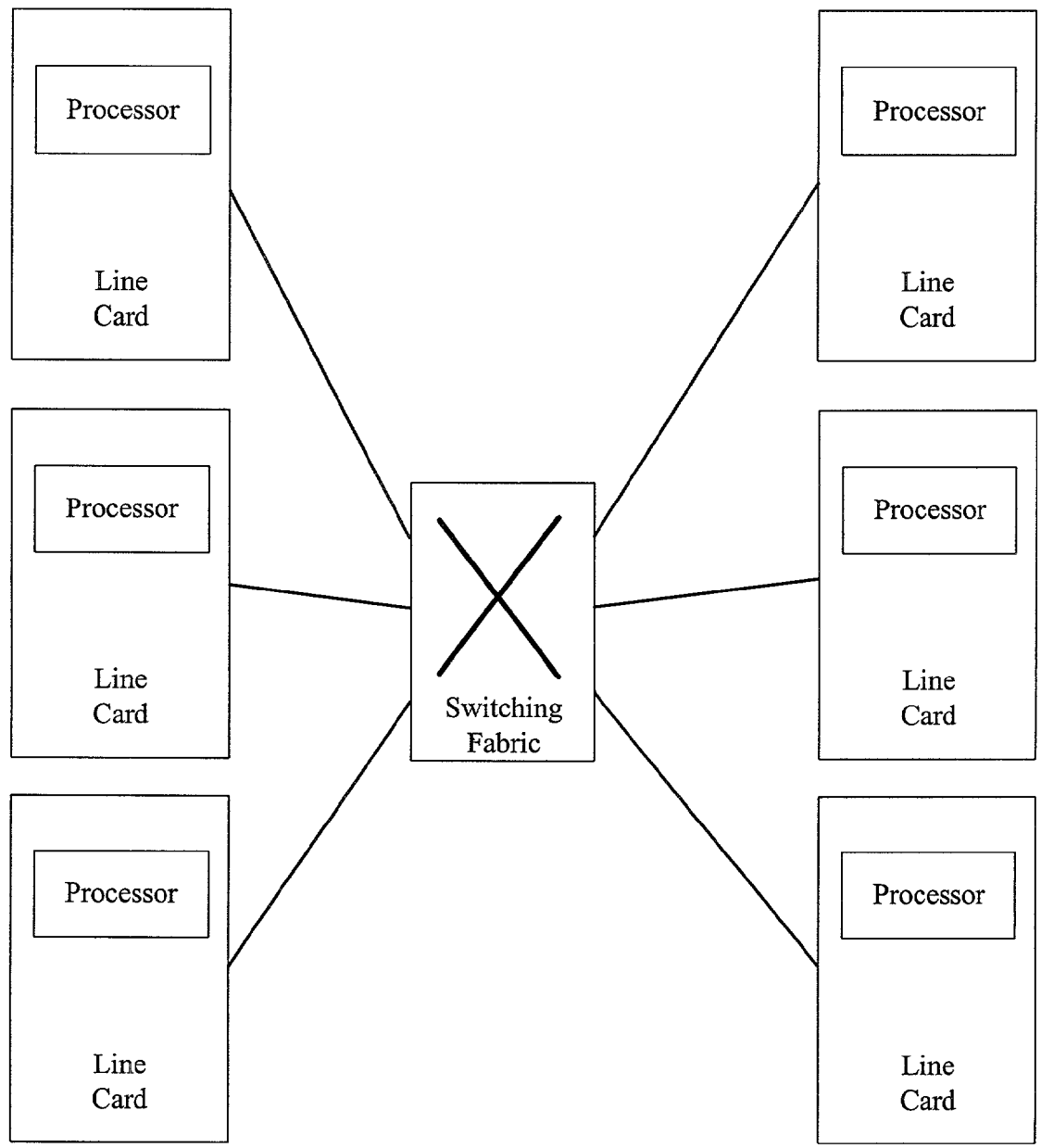
FIG. 1 illustrates a block diagram of a prior art switch.
Figure 2:
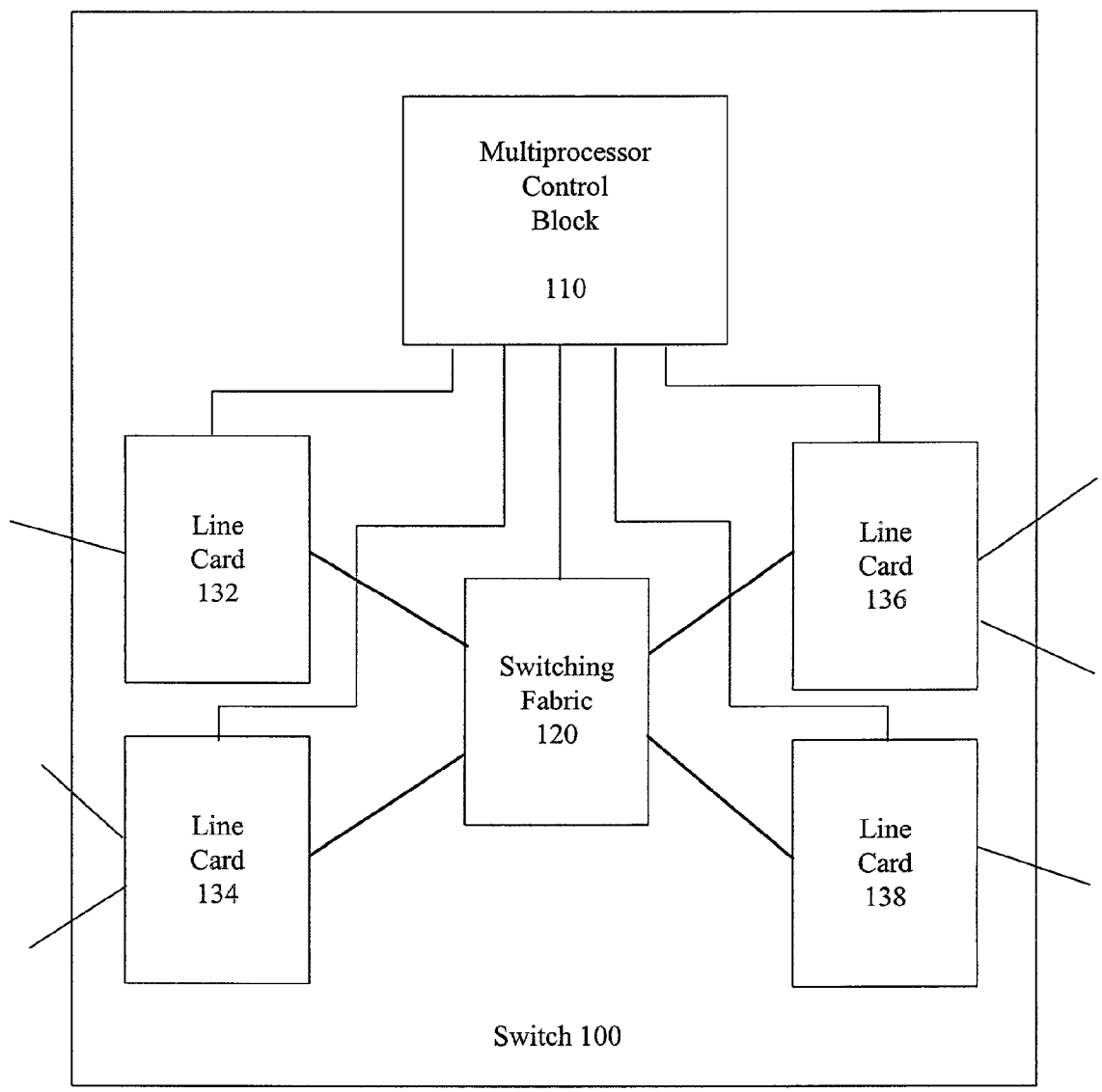
FIG. 2 illustrates a block diagram of a communication switch that includes a multiprocessor control block in accordance with a particular embodiment of the present invention.

The invention can be better understood with reference to FIGS. 2-7. FIG. 2 illustrates a block diagram of a communication switch 100 that includes a multiprocessor control block 110, a switching fabric 120, and a plurality of line cards 132-138. As is apparent to one of ordinary skill in the art, the number of line cards included within the switch 100 may vary from one implementation to the next. The switch 100 may be a switch used in an ATM network, or some other communication network that supports data communication using other protocols. For example, the switch 100 may support internet protocol (IP) packet traffic, where such packetized traffic may utilize Packet over Sonet (POS), multiprotocol label switching (MPLS), or packet over ATM communication techniques.

Rather than including individual processors within each of the line cards 132-138 to perform call processing and routing functionality as was the case in prior art systems, a unified multiprocessor control block 110 performs all of these functions for all of the line cards 132-138 included within the switch 100. Although this may reduce some of the benefits in terms of modularity and ease of expansion that existed in prior art distributed processing switches, the benefits obtained through the centralized processing greatly outweigh those forfeited.

Each of the line cards 132-138 includes ingress and egress connections. Ingress data traffic is received over the ingress connections and forwarded across the switching fabric 120 to an egress line card where it is sent out over an egress connection as egress data traffic. In some cases, ingress data traffic received by a line card will include call setup messages, or other control data that relates to call processing or routing functionality. Such traffic is forwarded to the multiprocessor control block 110 for further processing. The result of such processing may produce egress data units such as acknowledgement messages, which may be cells or packets that are to be forwarded through an egress line card to another switch of the communications network within which the switch 100 is included.

Figure 3:
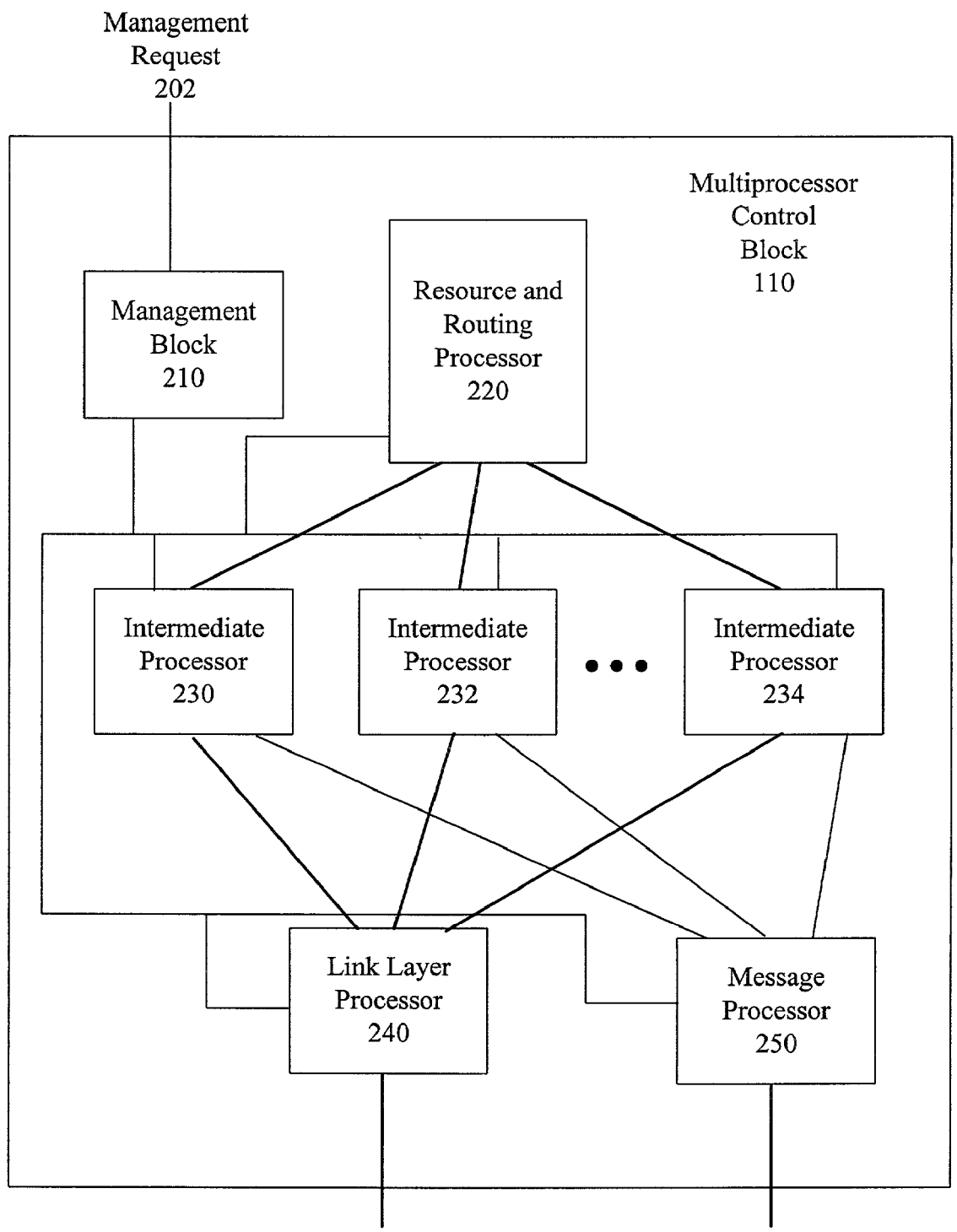
FIG. 3 illustrates a block diagram of one embodiment of the multiprocessor control block of FIG. 2.

FIG. 3 provides a block diagram of a particular embodiment of a multiprocessor control block 110 that may be included in the switch 100 of FIG. 2. The multiprocessor control block 110 includes a resource and routing processor 220, a plurality of intermediate processors 230-234, and a link layer processor 240. In other embodiments, a different array of processors may be included in the multiprocessor control block 110, where a division of functionality amongst the various processors is performed such that efficiency of operation of the multiprocessor control block 110 is optimized. The various functions performed by the processors included in the multiprocessor control block 110 may include those associated with a protocol stack 290 illustrated in FIG. 4.

The protocol stack 290 is an example protocol stack typically associated with a data communication system. The physical layer 296 corresponds to the lowest section of the protocol stack, and the physical layer may include operations relating to the specific protocol over which the data is being transmitted within the switch. Such processing can include support for protocols such as ATM, where the ingress and egress data units processed by the multiprocessor control block 110 may include ATM adaptation layer 5 (AAL5) packets made up of multiple ATM cells. In other embodiments, the physical layer 296 may support POS, DWDM, etc.

The functionality included in the physical layer processing 296 may be wholly performed within the link layer processor 240 included within the multiprocessor control block 110 of FIG. 3. In many cases, the amount of processing required to support the physical layer 296 is limited such that a single link layer processor 240 can provide all of the support for the data traffic requiring such processing within the switch. Conventional terminology would describe the processing operations performed by the link layer processor 240 as including all of the layer 2 functionality associated with the protocol stack 290.

The other portions of the protocol stack 290 associated with the multiprocessor control block include those corresponding to the signaling link layer 295, signaling protocol 294, call processing 293, and connection resource allocation and routing 292. The signaling link layer portion 295 includes functionality such as verification that the various links required by the system are up. The signaling protocol portion 294 includes support for control traffic required for setting up calls, tearing down calls, etc. Various protocols may be supported by this portion, including MPLS, narrow band ISDN, broadband ISDN, etc. The call processing portion 293 includes the functionality associated with the operations required to support the processing of calls or connections that utilize the switch within their data path. The connection resource allocation and routing portion 292 includes the functionality associated with selecting egress routes for connections that utilize the switch, and allocating the available data bandwidth and connection resources within the switch amongst the multiple calls supported.

In addition to performing all of the processing operations corresponding to layer 2, the link layer processor 240 may also perform some of the processing operations associated with layer 3 processing. Such layer 3 processing may include the distribution of the responsibility for maintaining the call resources (e.g. context information, etc.) for individual calls to the various intermediate processors that are present within the system. This will be described in additional detail below. Similarly, the link layer processor 240 may also perform functions typically associated with layer 2 processing such as the distribution of global call references or signaling messages that apply to all of the calls that are active. This is also described in additional detail below.

Each of the intermediate processors 230-234 performs call-processing operations for a corresponding portion of the connections supported by the switch. Call processing includes handling subscriber features for various calls, wherein a particular example, such subscriber features may include caller ID, private line, or other features that require the switch to perform certain support tasks. The functionality associated with such call processing is easily distributed amongst multiple processors such that efficiencies can be obtained through parallel processing of multiple requests. As is apparent to one of ordinary skill in the art, if the system does not require parallel processing resources for efficient calling processing, a single intermediate processor or a fewer number of intermediate processors may be included within the multiprocessor control block 110. In other cases, the number of intermediate processors may be increased to supplement the parallel processing capabilities of the multiprocessor control block 110.

The resource and routing processor 220 performs the functions associated with resource distribution and routing. By having a global perspective on the available routes and resources within the entire switch, the resource and routing processor is able to perform its duties in a manner that may provide better alternate routes or better utilization of resources that was not possible in prior art systems. The various resources that are allocated by the resource and routing processor 220 may include the channels available between the switches, where in an ATM network, such channels may include virtual channel connections (VCCs) and virtual path connections (VPCs). In an MPLS system, resources may include the distribution of the MPLS labels associated with the label switched paths existing within the network. The bandwidth allocation that may be performed by the resource and routing processor 220 may include performing connection admission control (CAC) operations. The bandwidth available for allocation may be divided up based on the quality of service (QOS), traffic rates, etc. associated with the various lengths within the switch.

Figure 4:
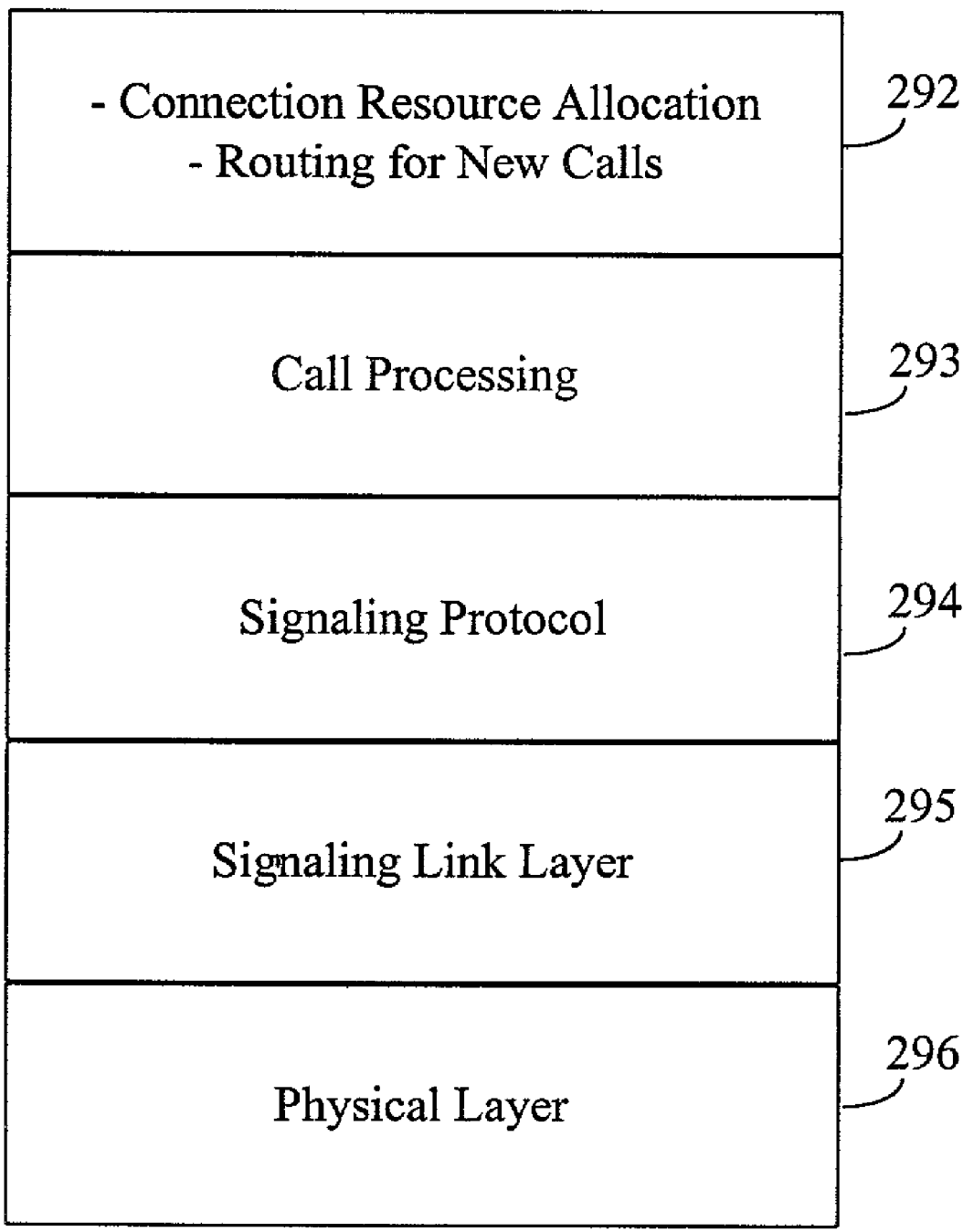
FIG. 4 provides a graphical representation of a protocol stack associated with processing within a communication switch in accordance with a particular embodiment of the present invention.

Thus, the various portions of the protocol stack 290 shown in FIG. 4 are divided amongst the resource and routing processor 220, the plurality of intermediate processors 230, and the link layer processor 240. Such a division allows for a common processor to support certain functionality within the switch whereas when distribution of the processing is possible to multiple processors, the advantages of parallel processing can be realized.

When the link layer processor 240 receives ingress data units that must be processed, such as ingress data units corresponding to a call setup message, the link layer processor 240 forwards those ingress data units to a selected one of the intermediate processors 230-234 for additional processing. As stated above, the intermediate processors 230-234 all perform similar processing operations, where multiple intermediate processors allow for parallel processing to occur. Specifically, the intermediate processors perform functions such as those included in the signaling layer of the protocol stack described with respect to FIG. 4 as well as call processing operations.

The link layer processor 240 determines to which of the intermediate processors 230-234 the ingress data units corresponding to a call setup message are forwarded based on some type of prioritization scheme. In some embodiments, the prioritization scheme may be as simple as a round robin scheme such that the link layer processor 240 moves from one intermediate processor to the next as ingress data units corresponding to various messages are received. In other embodiments, the prioritization scheme may take into account the loading on each of the intermediate processors when assigning the ingress data units to one of the intermediate processors for processing. Thus, if one intermediate processor is overloaded, rather than forwarding new data to be processed to that processor, a less loaded intermediate processor is selected instead. The loading on the various intermediate processors may be determined based on the current loading on the ingress queues that receive data units from the link layer processor 240. Such ingress queues within the intermediate processors 230-234 are described in additional detail with respect to FIG. 7 below.

At various points within the multiprocessor control block 110, a sequence number that corresponds to a particular call may be assigned to each of the ingress data units for that call. As such, when the intermediate processor completes its processing operations on the ingress data unit and forwards it to the resource and routing processor 220 for subsequent processing, the sequence number can be used to ensure that the ordering of the various processing operations is maintained or at least understood. Thus, the resource and routing processor 220 may utilize the sequence numbers to identify a particular point in a processing time line that is associated with each call. If resources corresponding to a particular call are subsequently allocated to a different call and a command is later received by the resource and routing processor 220 corresponding to the previously existing call, that command will include the sequence number associated with the previous call. As such, the resource and routing processor 220 can choose to discard or disregard the command as the call is no longer active. However, the resource and routing processor can also identify similar commands for the current call that is now utilizing those resources based on a match between the current sequence number associated with the resources addressed in the command, as that sequence number also corresponds to the current call that has been established.

In a specific example, assume that a first command is received that establishes a call using a virtual connection identifier (VCI) 20. A short time later, a decision is made to reallocate that VCI to a new call. In order to reassign the VCI, the old call is released and the new call is created. If the two commands associated with releasing the old call and creating the new call are sent in quick succession to the switch, these commands may take different parallel paths through different intermediate processors. These parallel paths may have different latencies such that the call setup message associated with the VCI 20 may be received by the resource and routing processor prior to the call release message associated with the old call. When the resource and routing processor 220 services the call setup message such that the VCI 20 is now assigned to the new call, it will assign that call a new sequence number. Thus, when the call release command associated with the sequence number of the old call is received, the resource and routing processor 220 will recognize that this command was intended to release the old call and not the call that has just been set up. As such, the newly set up call will not be released.

In order to ensure that certain processing operations that must be performed by the same intermediate processor for a specific call are performed by the same intermediate processor, the link layer processor 240 may maintain some type of indication as to where certain ingress data units have been forwarded in the past. Thus, if a first message corresponding to a first call is directed to the intermediate processor 230, and a second message corresponding to the same first call is later received that requires processing by the intermediate processor 230, the link layer processor 240 will have maintained a record as to which of the intermediate processors processed the first message such that appropriate forwarding of the second message can occur. The context for specific calls maintained within one of the intermediate processors 230-234. As such, when messages corresponding to the call context are received that may modify or utilize the call context, they must be forwarded to the appropriate intermediate processor for processing.

Thus, for messages corresponding to new calls, or messages that are processed independently of a specific intermediate processor associated with a specific call, the link layer processor 240 may forward such messages based on the prioritization scheme. In other cases where dependencies between a received message and a previously processed message exists, the link layer processor 240 may forward these ingress data packets based on history data that it stores relating to ingress data packets that it has forwarded in the past.

In some instances, global call reference messages directed to all calls will be received by the link layer processor 240. Such global call references or universal signaling messages are recognized by the link layer processor 240 and distributed to all of the intermediate processors 230-234. In some instances, such global call references or signaling messages require a response. When this is the case, the link layer processor 240 may collect responses to the global call reference from each intermediate processor and compile these responses to produce a unified response.

An example of a global call reference or signaling message that applies to all calls, is a "clear all calls" message. Such call clearing requires acknowledgement. As such, when the link layer processor 240 receives such a global call reference, it forwards it to all of the intermediate processors 230-234. The link layer processor 240 then collects all of the acknowledgements corresponding to the call clearing performed within the intermediate processors 230-234 and sends an accumulated acknowledgement to the entity which issued the clear all calls message.

In order to facilitate interaction between the various intermediate processors 230-234 and the line cards included in the switch, a message processor 250 may be included in the multiprocessor control block 110. The message processor 250, which is operably coupled to the plurality of intermediate processors 230-234 and the plurality of line cards included in the switch, supports messaging between the plurality of intermediate processors 230-234 and one or more of the line cards. The message processor 250 may act as a queuing point for messages between the intermediate processors 230-234 and the line cards, where multiple messages are bundled together for distribution to the various line cards in order to improve the efficiency with which such messages are communicated.

The multiprocessor control block 110 may also include a management block 210 that is operably coupled to the other processors included within the multiprocessor control block 110. The management block 210 receives management requests 202 that it processes to produce configuration commands issued to the various processors included within the multiprocessor control block 110. Management block 210 may also provide configuration information to line cards included within the switch. Management block 210 may be used to retrieve statistics or current configuration settings and status information from the various line cards and processors included within the switch. Furthermore, the management block 210 may store a database that can be used for autorecovery by the switch in the case of a power outage or similar failure.

The specific multiprocessor control block 110 illustrated in FIG. 3 only includes a single link layer processor 240 that supports all of the line cards included within the switch. In another embodiment illustrated in FIG. 5, a single resource and routing processor 320 supports two sets of distributed processors associated with different sets of line cards 342, 362 included within the switch. Thus, the first set of line cards within the switch 342 is supported by a link layer processor 340. The link layer processor 340 is coupled to a first plurality of intermediate processors 330-334 that perform the call processing and signaling layer processing for the calls associated with the first set of line cards 342.

Similarly, a second set of line cards 362 is supported by a second link layer processor 360. The link layer processor 360 forwards ingress data units received via the second set of line cards 362 to an appropriate one or more of the intermediate processors 352-356.

Figure 5:
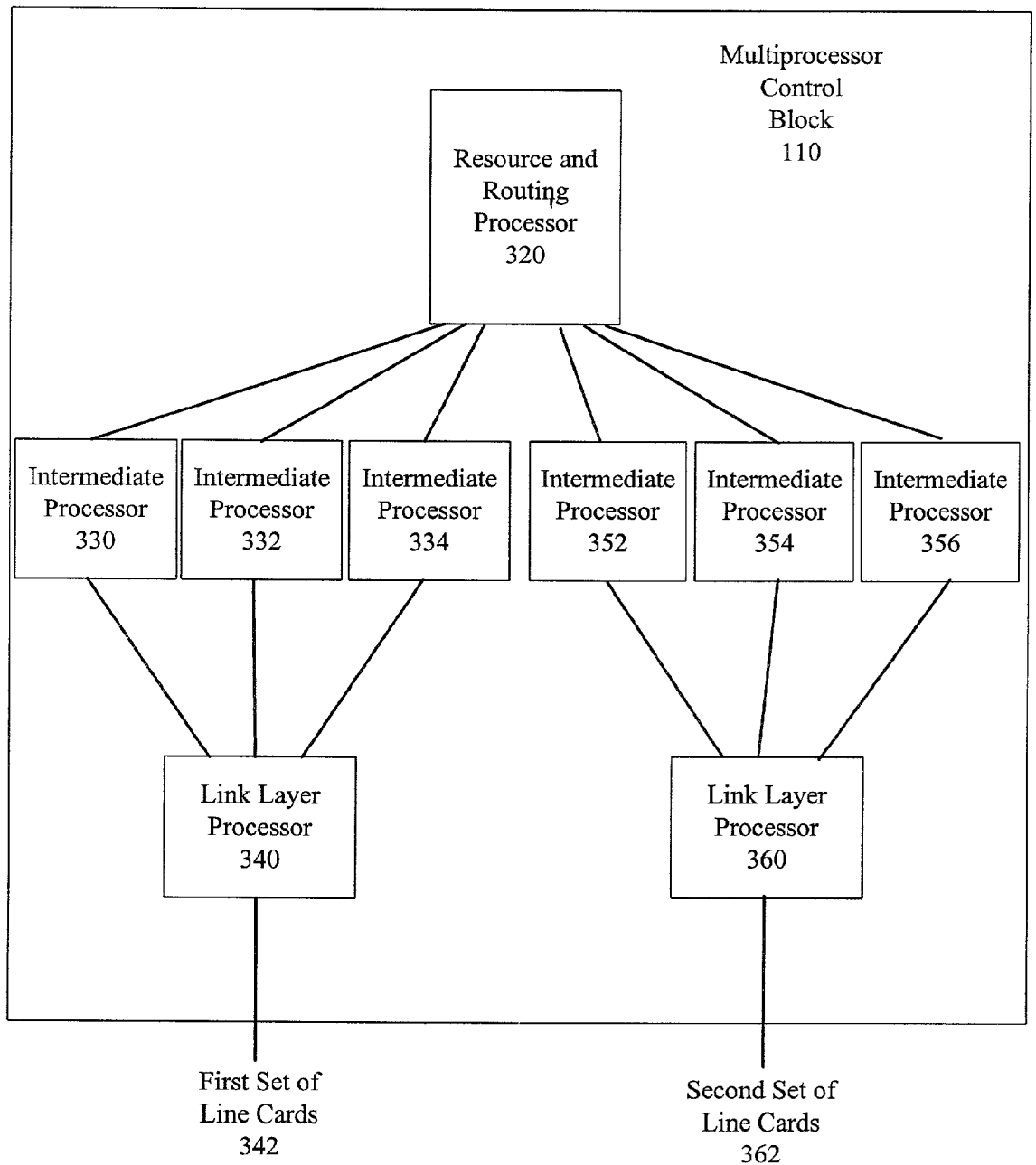
FIG. 5 illustrates a block diagram of an alternate embodiment of the multiprocessor control block of FIG. 2.

Although a greater level of processing distribution exists in the multiprocessor control block illustrated in FIG. 5 than that illustrated in FIG. 3, a single resource and routing processor 320 is still used in the multiprocessor control block 110 of FIG. 5 to oversee all of the resource allocation and routing for the entire switch and all of its corresponding line cards. As such, the benefits of a centralized resource and routing processor are realized along with possibly some additional benefit in the distribution of other portions of the processing tasks associated with the maintenance of the calls within the switch.

In many instances, congestion within a data communication switch can result in the undesired loss of certain messages that may be crucial to the proper operation of the switch. As such, reduction or elimination of congestion within the switch is highly desirable. By positioning queuing structures at appropriate points within the switch and ensuring that congestion is isolated to certain selected queuing points, overall congestion within the switch can be greatly reduced, thus improving the efficiency with which the switch is able to operate.

Figure 6:
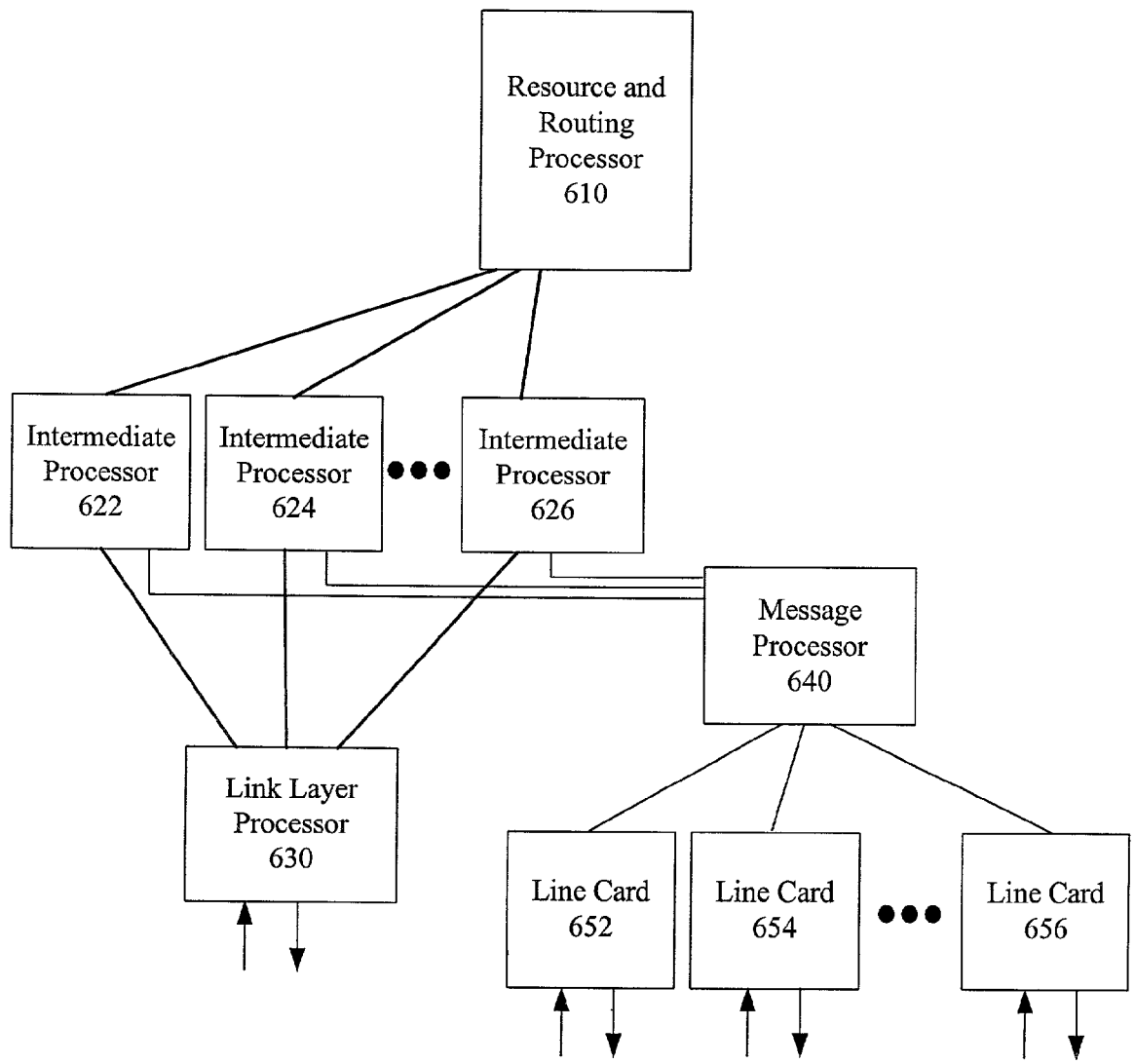
FIG. 6 illustrates a block diagram of the various components included in a communication switch that includes a multiprocessor control block in accordance with a particular embodiment of the present invention.

FIG. 6 illustrates a general architectural view of a communication switch that includes a multiprocessor control block. The multiprocessor control block includes the resource and routing processor 610, the plurality of intermediate processors 622-626, the link layer processor 630, and may also include the message processor 640. The message processor 640 allows the plurality of intermediate processors 622-626 to interact with the line cards 652-656 included in the switch. The data flow amongst these various processors and the line cards presents numerous points at which queuing and monitoring of such queuing can be used to reduce congestion and improve throughput within the switch. In order to illustrate the various queuing structures that can be included in the processors and line cards, a simplified block diagram is provided in FIG. 7.

Figure 7:
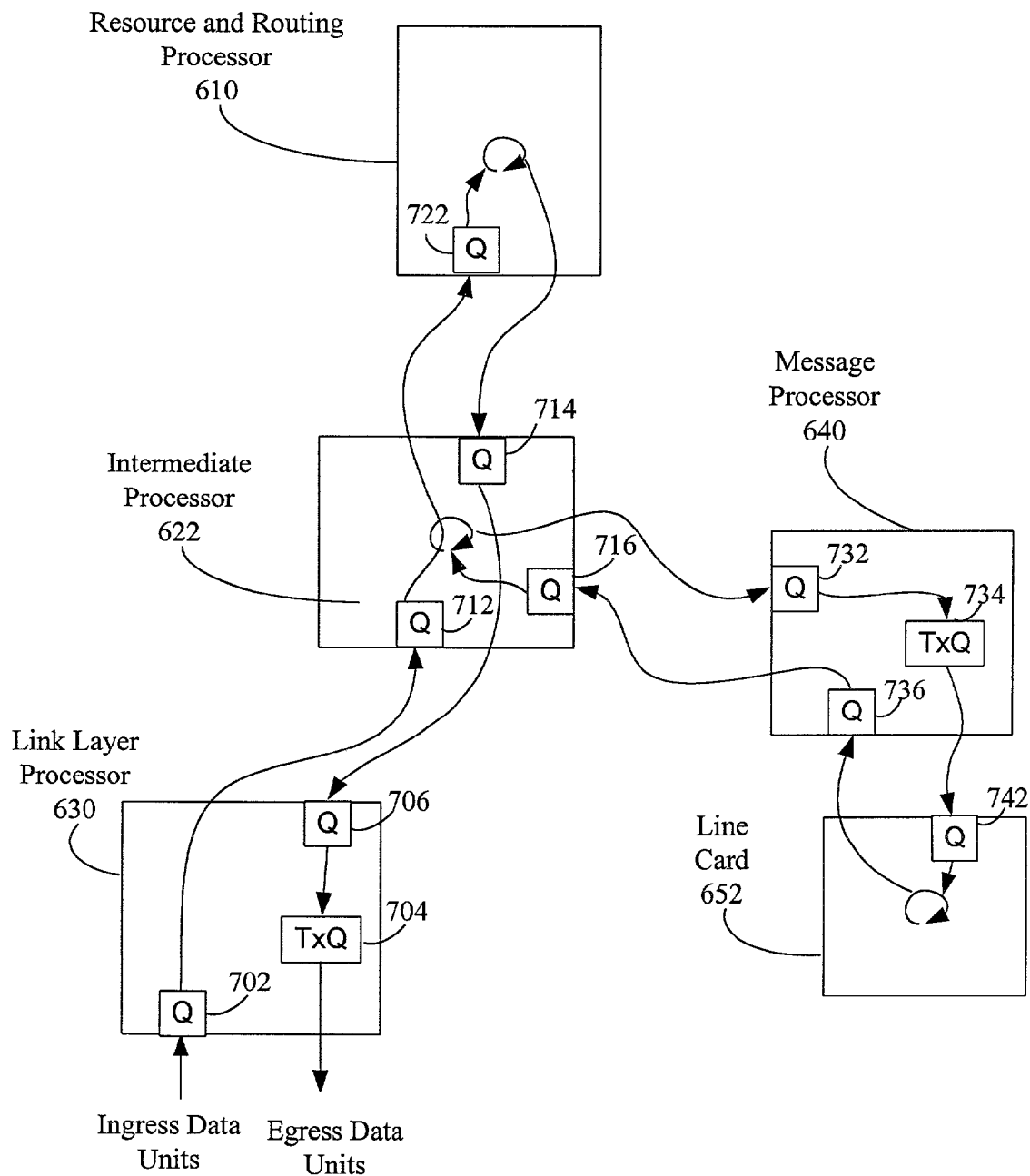
FIG. 7 illustrates a block diagram showing the various queuing structures included in the various processing entities within a communication switch that includes a multiprocessor control block in accordance with a particular embodiment of the present invention.

FIG. 7 reduces the number of entities included within the switch such that only a single intermediate processor 622 and a single line card 652 are shown. However, the various queue structures shown for these blocks are preferably also included in additional intermediate processors and line cards that may included within the switch.

As stated above, the queuing structures included in the various processors and other parts of the system are intended to allow the entities to interact with each other in a manner that makes maximum use of the resources available. However, certain entities within the system may be overloaded to the point where there is too much data flowing through the system for the data to be dealt with appropriately. As such, queue backups and congestion can occur. By configuring the system such that congestion is concentrated at specific queue structures, those queue structures can be designed to include special control circuitry that deals with the congestion in an intelligent manner. By isolating the congested queuing points and understanding how those points become congested, the appropriate measures that may be taken to help alleviate the congestion are better understood. Furthermore, by only putting the circuitry adapted to deal with congestion at those points where congestion is expected to concentrate, the overhead associated with such additional circuitry is minimized.

Referring to FIG. 7, the link layer processor 630 receives ingress data units at a queuing point 702. These ingress data units may be received from a neighboring node within the network. Because of the link protocol, only a fixed number of ingress data units will be received from the neighboring node until an acknowledgement is sent to the neighboring node that indicates that the ingress data units already sent have been properly processed. Thus, the neighboring node will not send over any more ingress data units until those already sent have been processed. As such, this queuing point is a "windowed" queuing point such that it cannot become congested due to the feedback path that exists.

From the queuing point 702, the ingress data units are routed to a particular intermediate processor of the plurality of intermediate processors included in the multiprocessor control block. The example shown in FIG. 7, ingress data units are forwarded from the queuing point 702 to a queuing point 712 included in the intermediate processor 622. The queuing point 712 may have a corresponding threshold level that is used to monitor the contents of the queue 712. If the threshold level is exceeded, an indication is relayed back to the link layer processor 630 and the windowing available at the queuing node 702 is used to slow down the inflow of data units such that the flow to the queuing point 712 is limited until the threshold is no longer exceeded. Thus, the windowing available at the queuing point 702 can be used to ensure that congestion does not build up at the queuing node 712 in the intermediate processor 622. In some embodiments, the windowing function at the queuing node 702 simply discards incoming data units when congestion exists within the intermediate processor 622. In other embodiments, a buffer of limited size may be present at the queuing point 702 such that when the limits of this limited buffer are exceeded, discarding of the incoming data units occurs until the congestion is alleviated.

After retrieval from the queue 712 and processing by the intermediate processor 622, data units are forwarded to the resource and routing processor 610, where they are stored in a queue 722. Typically, the resource and routing processor 610 has adequate bandwidth to act quickly on the data that is receives at the queuing point 722. As such, congestion is not typically a problem within the resource and routing processor 610. However, in the case where conditions cause congestion, a similar threshold determination within the queue 722 can trigger a processing stoppage in one or more of the plurality of intermediate processors 622. This may cause congestion within the queue of the intermediate processor that trickles back to the windowed queuing unit 702 of the link layer processor 630. As such, downstream congestion trickles back upstream until windowed queue structure is reached, and at that point the windowing is used to ensure that this congestion is not increased.

Once the resource and routing processor 610 completes processing of data from its ingress queue 722, acknowledgements of such actions are typically generated that are to be sent back out in an egress message made up of one or more egress data units. These egress data units are forwarded to an egress queue in one of the plurality of intermediate processors, such as the egress queue 714 of the intermediate processor 622. Such acknowledgement messages are given preferential treatment by the intermediate processor 622 such that they are processed quickly. If the bandwidth within the intermediate processor 622 is limited, and the queue 714 begins to become filled, more bandwidth will be allocated to processing the acknowledgment messages than that allocated to processing the ingress call setup requests that may be pending in the ingress queue 712. This may result in the data in the ingress queue 712 exceeding the threshold level such that the windowing available at the queue 702 in the link layer processor 630 is used to ensure further congestion does not occur. As such, the high priority given to processing of acknowledgment messages stored in the queue 714 ensures that congestion does not occur on the egress path through the various intermediate processors.

A similar strategy is used with respect to the egress queue 706 included within the link layer processors 630. By giving egress data units processing priority within the link layer processor 630, the windowing function available on the queue 702 can help to ensure that congestion does not overwhelm the link layer processor 630.

The link layer processor 630 may also include a transmit queue 704 that is used to transmit acknowledgement messages and other egress data units. The transmit queue may utilize a sliding window that allows for multiple messages to be passed without acknowledgement. When acknowledgment for any of those messages is received, another message can be sent such that there are always a certain number of messages that have been sent and are awaiting acknowledgement. For example, if the sliding window allows for a window size of three messages, and five messages have been received for transmission, three may be initially sent. The other two that have not yet been sent are stored in the transmit queue until an acknowledgement is received corresponding to one of the initial three that were sent out. Once acknowledgement is received for one of the original three messages sent out, then one of the remaining two stored within the transmit queue can be sent out.

The transmit queue 704 of the link layer processor 630 transmits egress data units to a downstream node, where the downstream node receives these egress data units as ingress data units at a queue similar to the queue 702. Thus, the downstream node will have a windowed queue structure, where the windowed queue may limit the transmission bandwidth available to the transmit queue 704. As such, if the downstream node becomes congested, the transmit queue 704 may become full. In such cases, some messages stored within the transmit queue for transmission may have to be discarded in order to ensure that other more important messages are not lost. In some embodiments, the decision to discard egress data units may be made by one or more of the intermediate processors such that discarded egress data units never reach the link layer processor 630. In other embodiments, the decision to discard egress data units may be made by the link layer processor 630 such that the data units are discarded after receipt from the intermediate processors.

Preferably, such message discarding by the transmit queue 704 is performed in an intelligent manner such that the consequences of such discard actions are minimized. For example, if new call setup messages are being forwarded through the network and are present within the transmit queue 704 along with acknowledgement messages corresponding to calls that have been recently established, the new call setup messages are preferentially discarded before any acknowledgement messages are discarded. A good deal of processing bandwidth may have already been expended to generate the conditions resulting in the acknowledgement message such that discarding such an acknowledged message would effectively waste all of those resources that have already been expended. In the case of a call setup message, the resources may not yet have been expended, and a subsequent call setup message can be issued without causing the high level of waste associated with discarding an acknowledgment message.

Once the congestion in the transmit queue 704 builds up to a threshold level, notification can be provided to the other processors within the switch such that those processors can make intelligent decisions regarding routing or other functions that may help to alleviate the congested condition at the transmit queue 704. This may include rerouting of calls or rejection of call attempts by the resource routing processor. Note that each port in a line card may have a similar transmit queue associated with it such that there are a number of transmit queues within the switch. Therefore, those that have become congested may be avoided by these intelligent routing decisions such that the congested transmit queues are allowed to recover from their congested condition.

Additional data paths exist with respect to the messaging processor 640 and the line card 652. Messages directed from the intermediate processor 622 to the ingress queue 732 of the message processor 640 may correspond to programming commands that are directed towards the various line cards that are supported by the message processor 640, including the line card 652. As the message processor 640 receives such ingress messages at the queuing point 732, threshold detection is used to ensure that the queuing point 732 does not become overly congested. If that threshold is exceeded, an indication is provided to the intermediate processor 622 and the resource and routing processor 610 so intelligent decisions can be made by routing and queue servicing such that generation of additional messages being fed to the message processor 640 is reduced or halted. This allows the congestion at the queue 742 to be relieved, and may result in the trickling down of such congestion eventually to the windowed queue 702.

In most cases, congestion at the queuing point 742 will not occur due to the fact that the messaging processor is typically a reasonably fast processor that performs fairly simplistic operations. As such, it is typically capable of providing the level of bandwidth needed to keep up with the distribution of messages to the various line cards and responses to the intermediate processors.

Within the message processor 640 there is a transmit queue associated with each of the line cards supported by the message processor 640. Thus, in the example shown in FIG. 7, the transmit queue 734 supports the line card 652. The transmit queue 734 includes a threshold value that, when exceeded, acts in a similar manner as the transmit queue 704 of the link layer processor 630. Thus, when the threshold is exceeded, the other processors included within the switch are notified. This may allow the processors to perform intelligent reroutes, stop changing the configuration of specific line cards, or do other things that help alleviate the congested condition. Preferably, no discarding of messages directed towards the line cards occurs within the transmit queue 734. This is because the messages directed to the line cards are associated with programming or deprogramming operations that result in a changed configuration of different devices included in the line cards. If such messages are discarded, the state of the line cards may not be properly established, thus resulting in errors within the network.

The queue 742 in the line card 652 is preferably a windowed queue such that it can control the inflow of data from the transmit queue 724 of the message processor 640. Once a configuration message is processed by the line card 652, an acknowledgement message is typically returned back to the intermediate processor 622. Because the inflow of configuration messages to the line card 652 is limited by the queue 742, the outflow of acknowledgement messages is similarly limited. However, the queue 736 of the message processor 640 may include threshold detection such that if the threshold is exceeded, the window corresponding to queue 742 may be closed until the acknowledgements sent to queue 736 are dealt with properly. Acknowledgements relayed from the queue 736 of the message processor 640 to the queue 716 of the intermediate processor 622 are given high priority within the intermediate processor 622. Thus, if congestion begins to occur within the intermediate processor 622, additional bandwidth is provided to processing the acknowledgements such that bandwidth is taken away from processing ingress data units in the queue 712. As such, the congestion may trickle down to the windowed queue 702 for eventual alleviation.

The various thresholds associated with the queues included in the routing system of the communication switch are preferably configured to a reasonably low level such that a steady state condition will generally exist along the data paths of the multiprocessing system block. Higher thresholds for these queues might allow for concentrations in traffic that could overwhelm a particular queue when that queue is too far away from a more controlled queuing point.

In other embodiments, the transmit queues for each of the line cards within the message processor may be moved into various intermediate processors in the plurality of intermediate processors included within the switch. As such, the feedback path corresponding to the provision of messages from the intermediate processor 622 to the line card 652 would exist within the intermediate processor 622. If congestion were detected, a broadcast of this congestion to the other processors within the system is still possible, however, centralizing such transmit queue structures within the message processor 640 provides added simplicity with respect to managing these transmit queues associated with the various line cards included within the switch.

By being able to detect a backlog of configuration messages directed towards the line cards in the transmit queues of the message processor 640, information regarding such congestion can be relayed to the various processors included within the switch. This allows the processors to make intelligent routing decisions that can allow such congestion to be alleviated, and also ensure that further congestion within these transmit queues does not occur such that messages aren't delivered within acceptable latency. Such bottlenecks can also severely degrade the efficiency of the switch as a whole. These features are not present in prior art systems, and become increasingly useful as data communication data rates continue to increase.

By coupling the ability to detect congestion at certain portions of the switch within a centralized routing processor, a much higher probability for determination of alternate routes based on congested conditions exists. In prior art systems, even if congested situations were detected, the potential for finding an appropriate alternate route was not as high as the routing and resource allocation processing within such prior art system was distributed amongst the various processors included in each of the individual line cards. As such, these individual processors had a limited perspective and were only presented with a fixed set of potential ultimate routes if they were in fact notified of such congestion on a particular output port. Within the system described herein, the number of alternate routes is greatly increased due to the global viewpoint of the centralized resource allocation and routing.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A multiprocessor control block for use in a communication switch, comprising:
   a resource routing processor that controls resource allocation amongst connections supported by the switch and routing functionality corresponding to at least a portion of the connections supported by the switch;
   a plurality of intermediate processors operably coupled to the resource routing processor, wherein each intermediate processor of the plurality of intermediate processors performs call processing for a corresponding portion of the connections supported by the switch, wherein call processing includes issuing resource allocation requests to the resource routing processor, wherein each intermediate processor of the plurality of intermediate processors performs functions associated with a signaling layer portion of a protocol stack; and a link layer processor operably coupled to the plurality of intermediate processors, wherein the link layer processor is operable to couple to a switching fabric of the communication switch, wherein the link layer processor receives ingress data units from the switching fabric and selectively forwards each ingress data unit received to at least one of the plurality of intermediate processors, wherein the link layer processor receives egress data units from the plurality of intermediate processors and forwards each of the egress data units to the switching fabric.

2. The multiprocessor control block of claim 1, wherein resource allocation includes allocation of channels within the switch.

3. The multiprocessor control block of claim 1, wherein resource allocation includes allocation of bandwidth within the switch.

4. The multiprocessor control block of claim 1, wherein call processing includes handling subscriber features.

5. The multiprocessor control block of claim 1, wherein the ingress and egress data units include asynchronous transfer mode (ATM) cells.

6. The multiprocessor control block of claim 5, wherein the ingress and egress data units include ATM adaption layer 5 (AAL5) packets.

7. The multiprocessor control block of claim 1, wherein the ingress and egress data units include Internet Protocol (IP) packets.

8. The multiprocessor control block of claim 1, wherein the link layer processor performs link management functions.

9. The multiprocessor control block of claim 1, wherein the link layer processor selectively forwards at least a portion of the ingress data units based on a prioritization scheme.

10. The multiprocessor control block of claim 9, wherein the prioritization scheme is a round-robin scheme.

11. The multiprocessor control block of claim 9, wherein the prioritization scheme is at least partially based on loading on each intermediate processor of the plurality of intermediate processors.

12. The multiprocessor control block of claim 1, wherein each ingress data unit corresponding to a particular call is assigned a sequence number corresponding to the particular call.

13. The multiprocessor control block of claim 1, wherein the link layer processor forwards ingress data units corresponding to a global call message to each intermediate processor of the plurality of intermediate processors.

14. The multiprocessor control block of claim 1, wherein the link layer processor collects responses to the global call message from each intermediate processor of the plurality of intermediate processors and compiles the responses to produce a unified response.

15. The multiprocessor control block of claim 1 further comprises a message processor operably coupled to the plurality of intermediate processors, wherein the message processor supports messaging between the plurality of intermediate processors and at least one line card.

16. The multiprocessor control block of claim 15, wherein the message processor acts as a queuing point for messages between the plurality of intermediate processors and the at least one line card.

17. The multiprocessor control block of claim 1 further comprises a management block operably coupled to the resource routing processor, the plurality of intermediate processors, and the link layer processor, wherein the management block receives management requests and issues configuration commands to the resource routing processor, the plurality of intermediate processors, and the link layer processor based on the management requests.

18. The multiprocessor control block of claim 1 further comprises:

a second plurality of intermediate processors operably coupled to the resource routing processor, wherein each intermediate processor of the second plurality of intermediate processors performs call processing for a second corresponding portion of the connections supported by the switch, wherein call processing includes issuing resource allocation requests to the resource routing processor, wherein each intermediate processor of the plurality of intermediate processors performs functions associated with a signaling layer portion of the protocol stack; and a second link layer processor operably coupled to the second plurality of intermediate processors, wherein the second link layer processor is operable to couple to the switching fabric of the communication switch, wherein the second link layer processor receives ingress data units from the switching fabric and selectively forwards each ingress data unit received to at least one intermediate processor of the second plurality of intermediate processors, wherein the second link layer processor receives egress data units from the second plurality of intermediate processors and forwards each of the egress data units to the switching fabric.

19. A communication switch, comprising:

a switching fabric;

a plurality of line cards operably coupled to the switching fabric; and a multiprocessor control block operably coupled to the switching fabric and the plurality of line cards, wherein the multiprocessor control block includes:

a resource routing processor that controls resource allocation amongst connections supported by the switch and routing functionality corresponding to at least a portion of the connections supported by the switch;

a plurality of intermediate processors operably coupled to the resource routing processor, wherein each intermediate processor of the plurality of intermediate processors performs call processing for a corresponding portion of the connections supported by the switch, wherein call processing includes issuing resource allocation requests to the resource routing processor, wherein each intermediate processor of the plurality of intermediate processors performs functions associated with a signaling layer portion of a protocol stack; and a link layer processor operably coupled to the plurality of intermediate processors, wherein the link layer processor is operable to couple to the switching fabric of the communication switch, wherein the link layer processor receives ingress data units from the switching fabric and selectively forwards each ingress data unit received to at least one of the plurality of intermediate processors, wherein the link layer processor receives egress data units from the plurality of intermediate processors and forwards each of the egress data units to the switching fabric.

20. The communication switch of claim 19, wherein the multiprocessor control block further comprises a message processor operably coupled the multiprocessor management block and the plurality of line cards, wherein the message processor supports messaging between the plurality of intermediate processors and the plurality of line cards.

21. The communication switch of claim 19, wherein the multiprocessor control block further comprises a management block operably coupled to the resource routing processor, the plurality of intermediate processors, and the link layer processor, wherein the management block receives management requests and issues configuration commands to the resource routing processor, the plurality of intermediate processors, and the link layer processor based on the management requests.

22. The communication switch of claim 21, wherein the management block is operably coupled to the plurality of line cards, wherein the management block issues configuration commands to at least one of the plurality of line cards.

23. The communication switch of claim 19, wherein the ingress and egress data units include asynchronous transfer mode (ATM) cells.

24. A method for processing ingress data units in a link layer processor of a multiprocessor control block in a communication switch, comprising:

receiving a first ingress data unit corresponding to a call;

selecting a first selected intermediate processor of a plurality of intermediate processors included in the multiprocessor control block, wherein selecting a first selected intermediate processor includes selecting a plurality of selected intermediate processors from the plurality of intermediate processors based on a global call reference included in the ingress data unit; and forwarding the first ingress data unit to the first selected intermediate processor, wherein forwarding the first ingress data unit includes forwarding the first ingress data unit to the plurality of selected intermediate processors.

25. The method of claim 24, wherein selecting the first selected intermediate processor further comprises selecting the first selected intermediate processor based on a prioritization scheme.

26. The method of claim 25, wherein the prioritization scheme includes a round robin scheme.

27. The method of claim 25, wherein the prioritization scheme is at least partially based on loading on each intermediate processor of the plurality of intermediate processors.

28. The method of claim 24 further comprises assigning a sequence number to the first ingress data unit, wherein the sequence number corresponds to the call.

29. The method of claim 28 further comprises:

receiving a second ingress data unit corresponding to the call;

assigning the sequence number corresponding to the call to the second ingress data unit;

selecting a second selected intermediate processor of the plurality of intermediate processors; and forwarding the second ingress data unit to the second selected intermediate processor.

30. The method of claim 24 further comprises:

collecting responses to the global call reference from each intermediate processor of the plurality of selected intermediate processors; and compiling the responses to produce a unified response.

* * * * *